D. R. McCULLOUGH.
DYNAMO VENTILATOR.
APPLICATION FILED APR. 16, 1908.
919,203.
Patented Apr. 20, 1909.
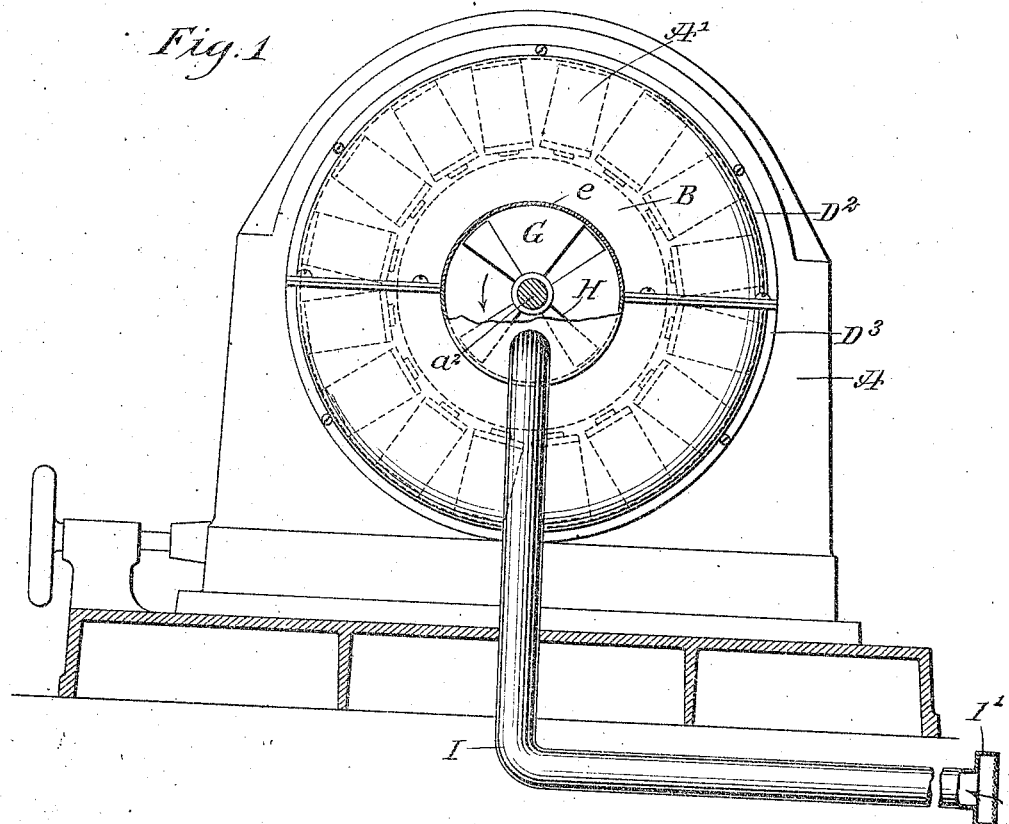
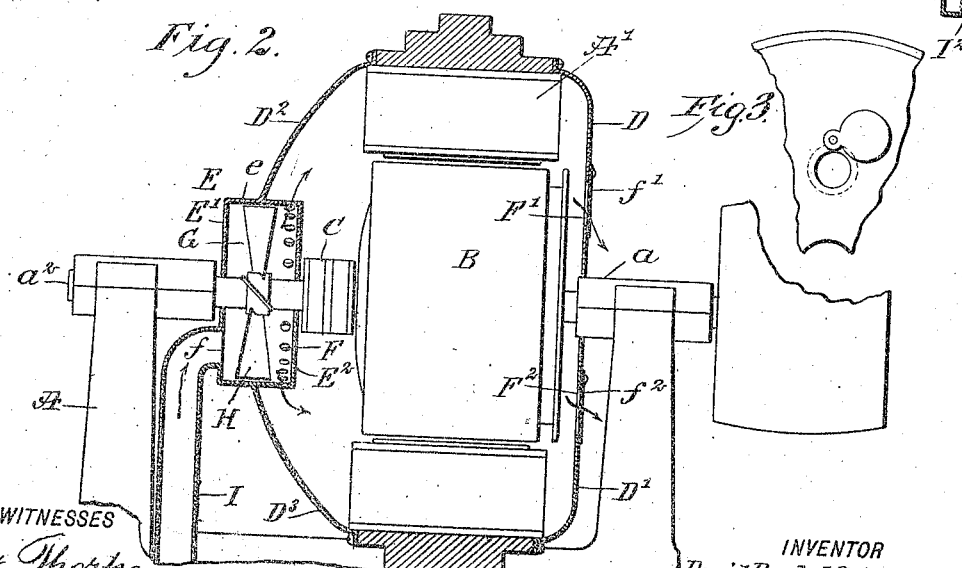
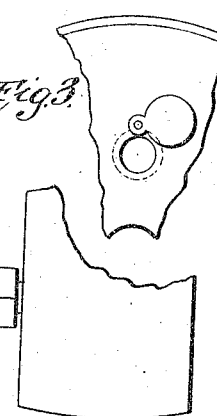
WITNESSES
Edw. Thorpe
A. E. Davis
INVENTOR
David Rush McCullough
BY
ATTORNEYS

UNITED STATES PATENT OFFICE.

DAVID RUSH McCULLOUGH, OF POCATELLO, IDAHO.

DYNAMO-VENTILATOR.

No. 919,203.   Specification of Letters Patent.   Patented April 20, 1909.

Application filed April 16, 1908. Serial No. 427,322.

*To all whom it may concern:*

Be it known that I, DAVID RUSH McCULLOUGH, a citizen of the United States, and a resident of Pocatello, in the county of Bannock and State of Idaho, have invented a new and Improved Dynamo-Ventilator, of which the following is a full, clear, and exact description.

My invention relates to means enveloping the dynamic elements of an electric generator or motor, for confining and restricting the ventilation of said machine to the parts to be ventilated, and to means for effecting an interchange of air through said parts.

The object of my invention is, first, to protect the dynamo from injurious heating during its operation and second, to maintain its efficiency in operation by obviating an increase in the electrical resistance due to the excessive heating of its circuits, which otherwise would fluctuate with the load and entail a loss of economy, and further, to protect the machine from moisture and dust. In pursuing these objects my attention was directed to the hazard to which dynamo electrical machines were subjected in mining operations, as well as in other instances when these machines are operated in locations where moisture and dust exist; and in order to circumvent the difficulties attending the operation of these machines under such circumstances, as well as to relieve the electrical circuits of excessive temperature under conditions of load which invariably augment the heat of the windings, particularly of the armature, I have constructed a housing embracing a system of ventilation which possesses certain features of construction described in the annexed specification and illustrated in the accompanying drawings forming part thereof, and the distinct features of novelty are more particularly referred to in the claim.

Referring to the drawings: Figure 1 is a side elevation of a multipolar dynamo electrical machine provided with a housing and air inlet pipe leading thereto, a portion of the housing being broken away exposing a ventilating fan; Fig. 2 is a vertical sectional elevation of the housing ventilating chamber and air inlet pipe, the lower portion of the dynamo being broken away. Fig. 3 is a front view of a portion of the housing and regulating shutter.

Similar characters of reference designate like parts in both views.

A designates a dynamo electrical machine having a plurality of field magnets A', and having mounted for rotation in the usual manner, the armature B. Carried by the framework of the dynamo A and secured thereto by screws, is my circulating ventilating housing, which is illustrated on the driving side of the machine (see Fig. 2), as consisting of semi-circular sections D and D'. As will be seen by reference to Fig. 1, these sections are flanged and secured together at their junction on a horizontal line taken through the diameter of the machine, and these two sections are centrally perforated to fit the journal box $a$. The housing thus disposed forms a wall for the drive side of the dynamo. The commutator or collector side of the dynamo is provided with a somewhat similar casing comprising the semi-circular sections $D^2$ and $D^3$. Each of these semi-circular sections, however, is somewhat spherical in form and sufficiently dished to extend along the shaft $a^2$ of the dynamo to envelop the collector or commutator C of the armature B. The sections $D^2$ and $D^3$ are each semi-circularly perforated for the reception of the ventilator fan box E, which consists of an annular ring $e$ and two side walls E' and $E^2$, said ring and side walls being secured together in any well known manner. The ring $e$ of the fan box E is perforated circumferentially, presenting a plurality of small openings F. These perforations provide an inlet for the system of ventilation, and the sections D, D' of the housing on the opposite side of dynamo are provided with the outlet openings F' and $F^2$, which are provided with regulating shutters $f'$ and $f^2$, respectively.

The side E' of the fan box is perforated at $f$ to admit of the delivery of air to the ventilating system. An inlet pipe I which leads from a suitable point where the air is in the desired condition for ventilation, is secured to the side wall E' of the fan box at the perforation $f$, which latter is arranged to register with the pipe I. Mounted upon and secured to the shaft $a$ of the dynamo A is a ventilating fan G, provided with blades or vanes H, and which fan when the shaft is set in rotation is driven thereby. At the terminal of the pipe I is a hood I' provided with a strainer $I^2$ of gauze. When the dynamo A has its armature B set in rotation, the ventilation through my improved system will be effected by the inhalation of air through the pipe I by the fan G, which air will be received by the ventilator box E and will be propelled by the said fan into the interior of the housing through the inlet perforations F in the ring e, effecting a sort of atmospheric shower in radial streams, the blast of which will thoroughly circulate between the field magnets A' and the armature circuits and other interstices of the dynamo machine, and will be finally expelled from the housing through the outlet perforations F' and F². The velocity of the air in circulating through the housing may be regulated by the closing of the outlet perforations more or less by means of the shutters f' and f².

It will be understood from the foregoing description of the construction of my improved dynamo ventilating system, that all dust, grit and moisture which may infest the air in the environments of the dynamo, may be excluded from the working parts of the machine, as the ventilator pipe I may communicate with a point in the atmosphere from which clean and dry air may be drawn, while at the same time the heated portion of the machine during operation may be maintained at such a temperature as desired for the proper working conditions within the limits of the ventilating capacity of the fan G. The several parts are readily assembled and the entire construction is simple and inexpensive.

Having thus described my invention, I claim as new and desire to secure by Letters Patent,—

In a ventilating system embracing a dynamo electrical machine, a sectional housing secured to the framework of the machine and enveloping the electro-dynamic elements thereof, a ventilator fan on one side of the machine carried and driven by the armature shaft thereof, a casing inclosing the fan and provided with radial perforations opening into the housing, an inlet pipe opening at a point remote from the machine and communicating with the fan casing, and adjustable shutters in the housing on the opposite side from the fan.

In testimony whereof I have signed my name to this specification in the presence of two subscribing witnesses.

DAVID RUSH McCULLOUGH.

Witnesses:
EARLE C. WHITE,
WILLIAM E. MILLENBERGER.